United States Patent
Iorga et al.

(10) Patent No.: US 9,467,302 B2
(45) Date of Patent: Oct. 11, 2016

(54) QUALITY OF SERVICE AWARE HYBRID MULTICAST NETWORKS

(71) Applicant: Avaya Inc., Basking Ridge, NJ (US)

(72) Inventors: Radu Iorga, Bucharest (RO); Richard Huang, Saratoga (CA); Curtis Santos, Santa Clara (CA)

(73) Assignee: Avaya Inc., Santa Clara, CA (US)

( * ) Notice: Subject to any disclaimer, the term of this patent is extended or adjusted under 35 U.S.C. 154(b) by 8 days.

(21) Appl. No.: 14/053,383

(22) Filed: Oct. 14, 2013

(65) Prior Publication Data

US 2015/0098467 A1   Apr. 9, 2015

(30) Foreign Application Priority Data

Oct. 7, 2013  (RO) .............................. A/00727/2013

(51) Int. Cl.
| | |
|---|---|
| *H04L 12/28* | (2006.01) |
| *H04L 12/18* | (2006.01) |
| *H04L 12/851* | (2013.01) |
| *H04L 12/715* | (2013.01) |
| *H04L 12/721* | (2013.01) |
| *H04L 12/761* | (2013.01) |
| *H04L 12/725* | (2013.01) |

(52) U.S. Cl.
CPC .............. *H04L 12/18* (2013.01); *H04L 45/64* (2013.01); *H04L 47/24* (2013.01); *H04L 45/12* (2013.01); *H04L 45/16* (2013.01); *H04L 45/302* (2013.01)

(58) Field of Classification Search
None
See application file for complete search history.

(56) References Cited

U.S. PATENT DOCUMENTS

| | | | | |
|---|---|---|---|---|
| 6,778,531 | B1* | 8/2004 | Kodialam | ............... H04L 12/18 370/256 |
| 2006/0187950 | A1* | 8/2006 | Bou-Diab | ............. H04L 12/185 370/432 |
| 2007/0086366 | A1* | 4/2007 | Luo | ..................... H04L 12/1827 370/260 |
| 2014/0376366 | A1* | 12/2014 | Li | .......................... H04L 45/16 370/230 |

OTHER PUBLICATIONS

Eugen Borcoci et al: "Resource Management and Signalling Architecture of a Hybrid Multicast Service for Multimedia Distribution", Sep. 22, 2008 (Sep. 22, 2008), Management of Converged Multimedia Networks and Services; [Lecture Notes in Computer Science], Springer Berlin Heidelberg, Berlin, Heidelberg, pp. 39-51.

(Continued)

*Primary Examiner* — Kouroush Mohebbi

(57) ABSTRACT

Methods, systems and computer readable media for quality of service aware hybrid multicast networks are described. A method can include receiving a request for content from a first receiver and initiating a quality of service aware hybrid tree construction by sending a multicast service level specification message to a first overlay tree manager. The method can also include dividing the tree at the overlay tree manager and communicating with other overlay tree managers in the network. The method can further include computing, at each overlay tree manager, a shortest path tree using a constrained algorithm and sending, from each overlay tree manager, a message to each IP manager in the network requesting that the IP managers construct an IP multicast tree and install the tree on one or more corresponding routers. The method can also include enforcing multicast routes and quality of service on the one or more routers.

18 Claims, 3 Drawing Sheets

(56) References Cited

OTHER PUBLICATIONS

Obreja S G et al: "Web-Service Solution for Inter-domain QoS Negotiation", Communication Theory, Reliability, and Quality of Service, 2008. CTRQ '08. International Conference on, IEEE, Piscataway, NJ, USA, Jun. 29, 2008 (Jun. 29, 2008), pp. 95-102.
Obreja S G et al: "Overlay Topology Based Inter-domain Qos Paths Building", Telecommunications, 2008. AICT '08. Fourth Advanced International Conference on, IEEE, Piscataway, NJ, USA, Jun. 8, 2008 (Jun. 8, 2008), pp. 64-70.
Borcoci E et al: "Overlay Management of Network Services for Multimedia Flows Transport over Multiple Domains—Testbed Validation", Telecommunications, 2009. AICT '09. Fifth Advanced International Conference on, IEEE, Piscataway, NJ, USA, May 24, 2009 (May 24, 2009), pp. 136-141.
Iorga Radu et al: "Management Driven Hybrid Multicast Framework for Content Aware Networks", IEEE Communications Magazine, IEEE Service Center, Piscataway,US, vol. 52, No. 1, Jan. 1, 2014 (Jan. 1, 2014), pp. 158-165.
International Search Report and Written Opinion dated Dec. 22, 2014 for PCT/US2014/059527.
PCT International Preliminary Report on Patentability mailed in PCT Application No. PCT/US2014/059527, Apr. 21, 2016, 8 pages.

* cited by examiner

QUALITY OF SERVICE AWARE HYBRID MULTICAST NETWORKS

FIELD

Embodiments relate generally to computer networks and more particularly, to systems methods and computer readable media for quality of service aware hybrid multicast networks.

BACKGROUND

IP multicast has traditionally been used as a technology option for one-to-many communications. However, IP multicast may suffer from one or more limitations, including group management, needed router capabilities, lack of QoS (quality of service) support and inter-domain issues.

Recently, Overlay Multicast (OM) has gained some attention. In Overlay Multicast, a basic concept is to move the multicast management (e.g., replication, group allocation, tree modification and the like) from the IP layer towards the application layer by involving end nodes (or special nodes inside the network) in the tree construction. This has led to the construction of hybrid trees having advantages of both IP multicast and OM.

Some conventional hybrid solutions may be based on a combination of OM and native multicast and seek to interconnect the two solutions with little or no consideration for the building of an IP multicast tree. These conventional approaches tend to consider the IP multicast tree as already built or that another native protocol will build the IP multicast tree. Moreover, these conventional solutions may not provide a QoS guarantee inside the domains nor in the inter-domain environment.

Embodiments were conceived in light of the above-mentioned problems and limitations, among other things.

SUMMARY

Some implementations can include a method including receiving a request for content, at a requestor having one or more processors, from a first receiver, and initiating a quality of service aware hybrid tree construction by sending a multicast service level specification message to a first overlay tree manager. The method can also include dividing the tree at the overlay tree manager and communicating with other overlay tree managers in the network. The method can further include computing, at each overlay tree manager, a shortest path tree using a constrained algorithm and sending, from each overlay tree manager, a multicast service level specification message to each IP manager in the network requesting that the IP managers construct an IP multicast tree and install the tree on one or more corresponding routers. The method can also include enforcing multicast routes and quality of service on the one or more routers.

The shortest path tree can cover all nodes in a network topology. The constrained algorithm can be constrained by quality of service parameters.

The method can also include pruning the shortest path tree of branches that have no receivers and branches that do not lead to receivers. The method can further include providing an (S, G) pair to one or more receivers, wherein the (S, G) pair corresponds to a group associated with the hybrid tree. The constrained algorithm can include a constrained Dijkstra algorithm.

Some implementations can include a system comprising one or more processors configured to perform operations.

The operations can include receiving a request for content, at the one or more processors, from a first receiver and initiating, at the one or more processors, a quality of service aware hybrid tree construction by sending a multicast service level specification message to a first overlay tree manager. The operations can also include dividing, at the one or more processors, the tree at the overlay tree manager and communicating with other overlay tree managers in the network. The operations can further include computing, at each overlay tree manager, a shortest path tree using a constrained algorithm.

The operations can also include sending, from each overlay tree manager, a multicast service level specification message to each IP manager in the network requesting that the IP managers construct an IP multicast tree and install the tree on one or more corresponding routers. The operations can further include enforcing multicast routes and quality of service on the one or more routers.

The shortest path tree can cover all nodes in a network topology. The constrained algorithm can be constrained by quality of service parameters.

The operations can also include pruning the shortest path tree of branches that have no receivers and branches that do not lead to receivers. The operations can further include providing an (S, G) pair to one or more receivers, wherein the (S, G) pair corresponds to a group associated with the hybrid tree. The constrained algorithm can include a constrained Dijkstra algorithm.

Some implementations can include a nontransitory computer readable medium having stored thereon software instructions that, when executed by a processor of a wireless controller, cause the processor to perform operations. The operations can include receiving a request for content, at the one or more processors, from a first receiver and initiating, at the one or more processors, a quality of service aware hybrid tree construction by sending a multicast service level specification message to a first overlay tree manager. The operations can also include dividing, at the one or more processors, the tree at the overlay tree manager and communicating with other overlay tree managers in the network. The operations can further include computing, at each overlay tree manager, a shortest path tree using a constrained algorithm.

The operations can also include sending, from each overlay tree manager, a multicast service level specification message to each IP manager in the network requesting that the IP managers construct an IP multicast tree and install the tree on one or more corresponding routers. The operations can further include enforcing multicast routes and quality of service on the one or more routers.

The shortest path tree can cover all nodes in a network topology. The constrained algorithm can be constrained by quality of service parameters.

The operations can also include pruning the shortest path tree of branches that have no receivers and branches that do not lead to receivers. The operations can further include providing an (S, G) pair to one or more receivers, wherein the (S, G) pair corresponds to a group associated with the hybrid tree. The constrained algorithm can include a constrained Dijkstra algorithm.

DETAILED DESCRIPTION

In general, embodiments can be configured to construct custom QoS aware hybrid multicast trees in two steps. In order to be able to offer the guarantees regarding QoS, the system constructs both an overlay tree and an IP multicast tree.

Figure 1:
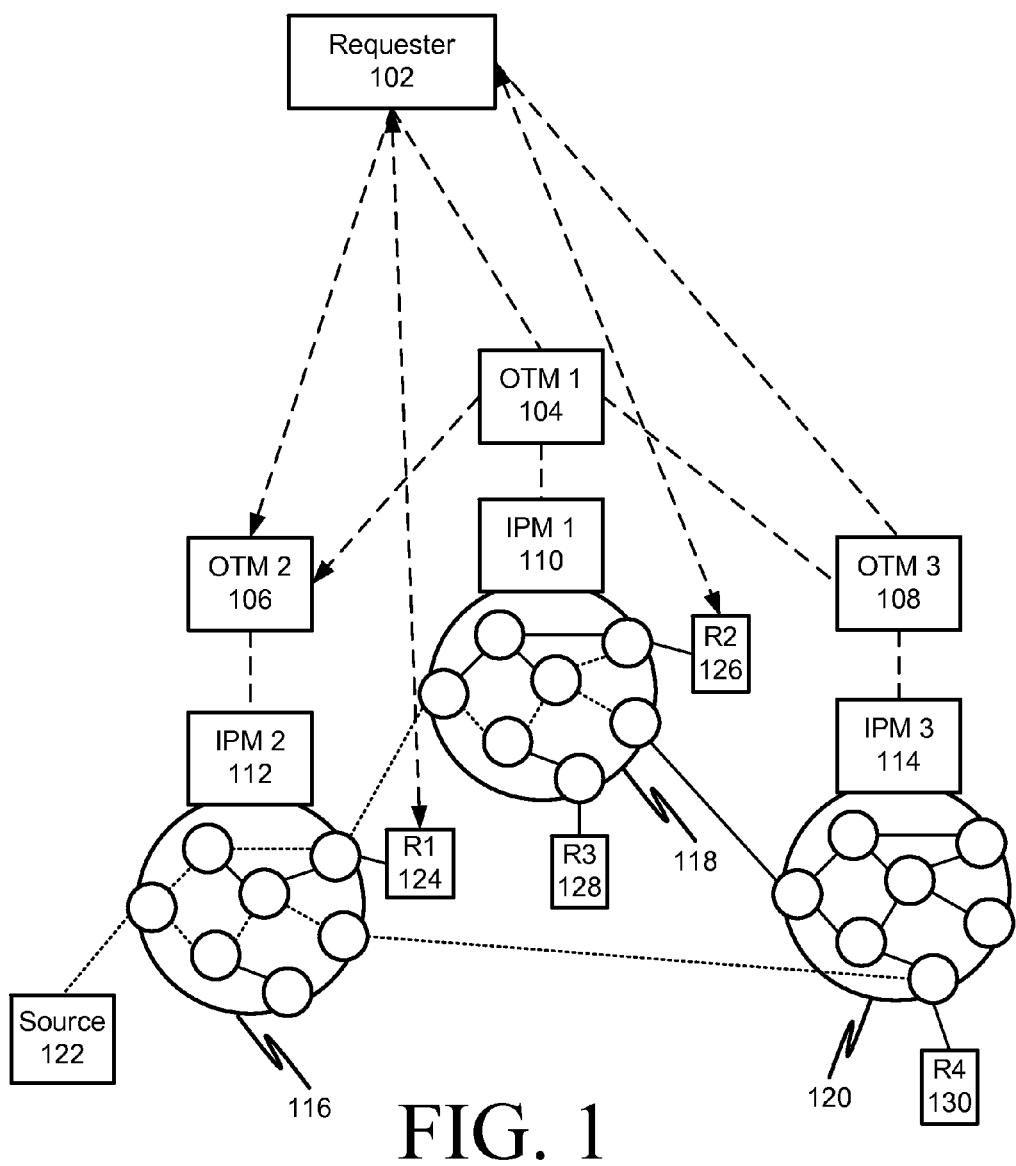
FIG. 1 is a diagram of an example quality of service aware hybrid multicast network in accordance with at least one embodiment.

FIG. 1 is a diagram of an example quality of service aware hybrid multicast network. In particular, the network 100 includes a requestor 102, a plurality of overlay tree managers (OTMs) 104-108 and corresponding IP managers (IPMs) 110-114, a plurality of IP islands 116-120, a source 122 and a plurality of receivers 124-130.

In operation, one or more users (e.g., one or more receivers 124-130) expresses an interest in a given piece of content. The requestor 102 receives the request for the content and issues a request to the OTMs 104-108 for the construction of the hybrid tree. In the request for the hybrid tree, the requestor can specify the source (e.g., 122), the receivers (e.g., one or more of 124-130) and a QoS guarantee required (e.g., 3 Mbs and max 100 ms delay).

The OTM at the source of the traffic (e.g., 106), which may be a content server is elected as the initiator of the tree. Assuming topology is known, this OTM will computer the overlay tree.

Using a constrained Dijkstra algorithm, the shortest path tree, covering all nodes from the topology, is computed. The constraints are imposed in the request received as described above. Branches having no receivers or which are not on the path to a receiver can be pruned. The resulting overlay tree is capable of guaranteeing the desired QoS.

It will be appreciated that while the Dijkstra algorithm is mentioned as an example, other algorithms capable of computing a shortest path tree with constraints could be used.

As the initiator of the tree construction, OTM 2 106 can split the tree into smaller parts and start a negotiation with other OTMs. The splitting may be needed because at the second phase of tree construction, when the IP multicast tree is constructed, one domain can become the receiver for the IP multicast tree. For example, in the case of the lowest link connecting IP Island 2 116 with IP Island 3 120, where the egress router of IP Island 2 116 could be declared as a receiver even though there is no actual receiver connected to it.

All the IPMs (e.g., 110-114) receive the local IP multicast tree request and compute the tree using the same algorithm discussed above, with a difference being that the nodes are physical routers at this level. After the multicast tree is computed, the new multicast routes and QoS constraints are enforced on the routers using any suitable remote configuration protocol (e.g., SNMP, web service, proprietary protocol or the like).

The requestor 102 is informed about the success of the tree building operation so that the end users can receive the (S, G) pair to use in order to join the group using IGMPv3. Users are most likely connected to access networks and not directly to an edge router of the domain. The system can use multicast service level specification (MSLS) messages for signaling during the process, as described below in FIG. 2.

Figure 2:
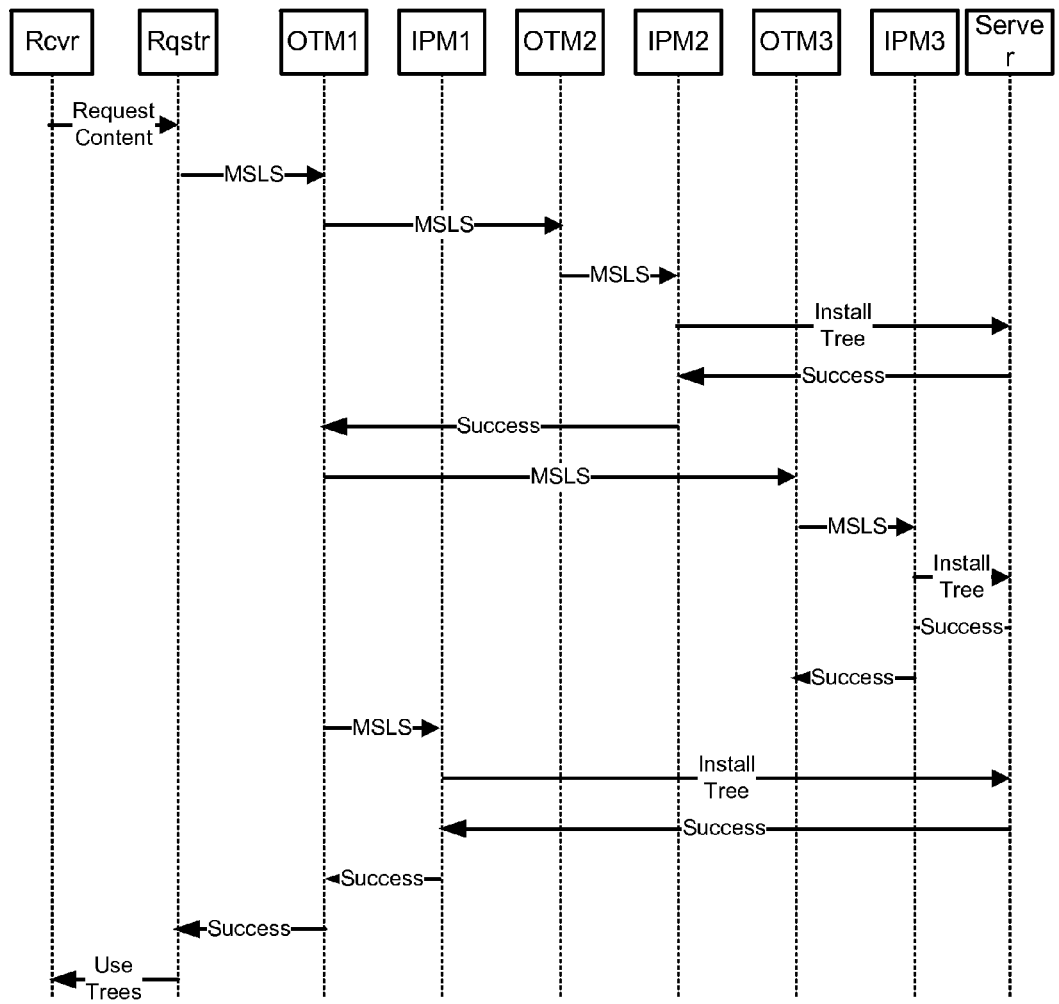
FIG. 2 is a message sequence diagram of an example method for quality of service aware hybrid multicast networks in accordance with at least one embodiment.

FIG. 2 is a message sequence diagram of an example method for quality of service aware hybrid multicast networks. Processing begins at 202, where one or more receivers request content via a message sent to a requestor. The requestor then sends an MSLS message to the originator OTM (e.g., OTM 1).

The originator OTM then sends an MSLS message to the next OTM (e.g., OTM 2), which in turn sends an MSLS message to IPM 2. IPM 2 computes a tree and installs the tree on the routers, which can respond with a success/failure indication.

OTM 1 then sends an MSLS message to OTM 3. OTM 3, in turn, sends an MSLS message to IPM 3, which computes a tree and installs it on the routers, which can respond with a success/failure indication.

OTM 1 then sends an MSLS message to IPM 1, which computes a tree and installs it on the routers, which can respond with a success/failure indication. IPM 1 can, in turn respond to OTM 1 with a success/failure message.

OTM 1 can respond to the requestor a success/failure message and the tree for the receivers to use to obtain the content.

Figure 3:
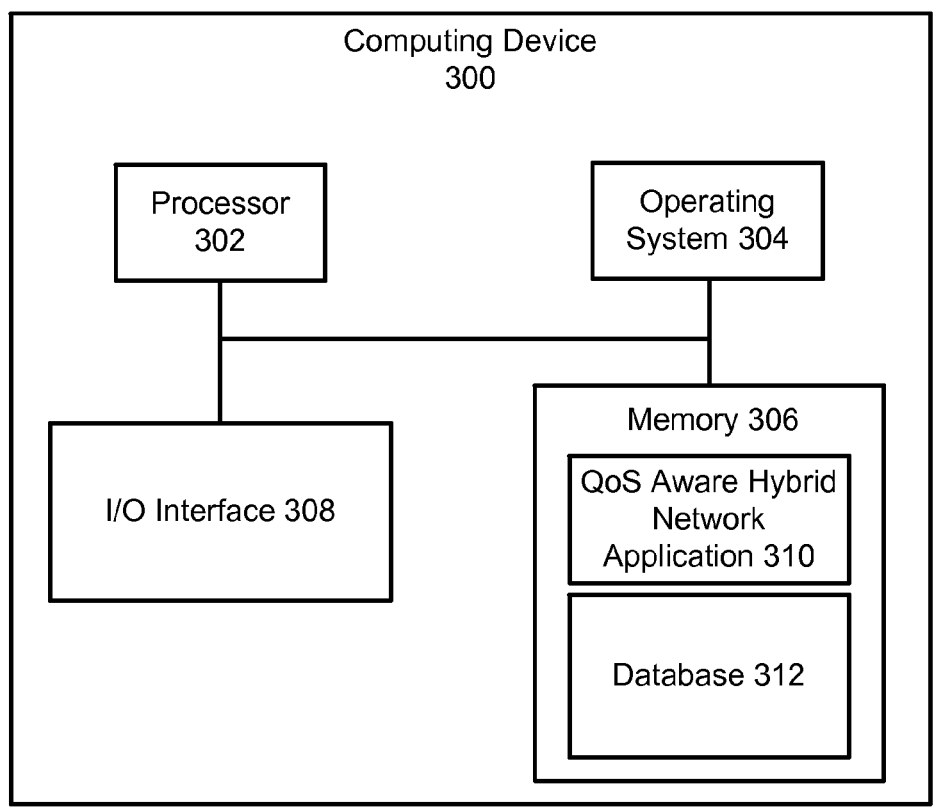
FIG. 3 is a diagram of a computer system for quality of service aware hybrid multicast networks in accordance with at least one embodiment.

FIG. 3 is a diagram of an example computer system 300 in accordance with at least one implementation. The computer 300 includes a processor 302, operating system 304, memory 306 and I/O interface 308. The memory 306 can include a quality of service aware hybrid multicast networks application 310 and a database 312.

In operation, the processor 302 may execute the application 310 stored in the memory 306. The application 310 can include software instructions that, when executed by the processor, cause the processor to perform operations for quality of service aware hybrid multicast networks in accordance with the present disclosure (e.g., performing one or more of steps 202-210).

The application program 310 can operate in conjunction with the database 312 and the operating system 304.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for quality of service aware hybrid multicast networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   receiving a request for content, at a requestor having one or more processors, from a first receiver;
   initiating a quality of service aware hybrid tree construction by sending a multicast service level specification message to a first overlay tree manager, the multicast service level specification message specifying a source, one or more receivers and a quality of service (QoS) guarantee required;
   electing an overlay tree manager at the source as initiator of overlay tree construction; computing, at the initiator of overlay tree construction, an overlay tree;
   dividing, at the one or more processors, the overlay tree at the initiator of overlay tree construction and communicating with other overlay tree managers in the network;
   computing, at each overlay tree manager, a shortest path tree using a constrained algorithm;
   sending, from each overlay tree manager, a multicast service level specification message to each Internet protocol (IP) manager in the network requesting that each IP manager construct an IP multicast tree for an IP island corresponding to that IP manager, where each node in the IP multicast tree corresponds to a physical router in the IP island and install the IP multicast tree on one or more corresponding physical routers in the IP island; and
   enforcing multicast routes and quality of service on the one or more routers.

2. The method of claim 1, wherein the shortest path tree covers all nodes in a network topology.

3. The method of claim 1, wherein the constrained algorithm is constrained by quality of service parameters.

4. The method of claim 1, further comprising pruning the shortest path tree of branches that have no receivers and branches that do not lead to receivers.

5. The method of claim 1, further comprising providing a source group (S, G) pair to one or more receivers, wherein the (S, G) pair corresponds to a group associated with the hybrid tree.

6. The method of claim 1, wherein the constrained algorithm includes a constrained Dijkstra algorithm.

7. A system comprising one or more processors configured to perform operations including:
   receiving a request for content, at the one or more processors, from a first receiver;
   initiating, at the one or more processors, a quality of service aware hybrid tree construction by sending a multicast service level specification message to a first overlay tree manager, the multicast service level specification message specifying a source, one or more receivers and a quality of service (QoS) guarantee required;
   electing an overlay tree manager at the source as initiator of overlay tree construction; computing, at the initiator of overlay tree construction, an overlay tree;
   dividing, at the one or more processors, the overlay tree at the initiator of overlay tree construction and communicating with other overlay tree managers in the network;

computing, at each overlay tree manager, a shortest path tree using a constrained algorithm;

sending, from each overlay tree manager, a multicast service level specification message to each Internet protocol (IP) manager in the network requesting that each IP manager construct an IP multicast tree for an IP island corresponding to that IP manager, where each node in the IP multicast tree corresponds to a physical router in the IP island and install the IP multicast tree on one or more corresponding physical routers in the IP island; and enforcing multicast routes and quality of service on the one or more routers.

8. The system of claim 7, wherein the shortest path tree covers all nodes in a network topology.

9. The system of claim 7, wherein the constrained algorithm is constrained by quality of service parameters.

10. The system of claim 7, wherein the operations further include pruning the shortest path tree of branches that have no receivers and branches that do not lead to receivers.

11. The system of claim 7, wherein the operations further include providing a source group (S, G) pair to one or more receivers, wherein the (S, G) pair corresponds to a group associated with the hybrid tree.

12. The system of claim 7, wherein the constrained algorithm includes a constrained Dijkstra algorithm.

13. A nontransitory computer readable medium having stored thereon software instructions that, when executed by a processor of a wireless controller, cause the processor to perform operations including:

receiving a request for content, at the one or more processors, from a first receiver;

initiating, at the one or more processors, a quality of service aware hybrid tree construction by sending a multicast service level specification message to a first overlay tree manager, the multicast service level specification message specifying a source, one or more receivers and a quality of service (QoS) guarantee required;

electing an overlay tree manager at the source as initiator of overlay tree construction;

computing, at the initiator of overlay tree construction, an overlay tree;

dividing, at the one or more processors, the overlay tree at the initiator of overlay tree construction and communicating with other overlay tree managers in the network;

computing, at each overlay tree manager, a shortest path tree using a constrained algorithm;

sending, from each overlay tree manager, a multicast service level specification message to each Internet protocol (IP) manager in the network requesting that each IP manager construct an IP multicast tree for an IP island corresponding to that IP manager, where each node in the IP multicast tree corresponds to a physical router in the IP island and install the IP multicast tree on one or more corresponding physical routers in the IP island; and enforcing multicast routes and quality of service on the one or more routers.

14. The nontransitory computer readable medium of claim 13, wherein the shortest path tree covers all nodes in a network topology.

15. The nontransitory computer readable medium of claim 13, wherein the constrained algorithm is constrained by quality of service parameters.

16. The nontransitory computer readable medium of claim 13, wherein the operations further include pruning the shortest path tree of branches that have no receivers and branches that do not lead to receivers.

17. The nontransitory computer readable medium of claim 13, wherein the operations further include providing a source group (S, G) pair to one or more receivers, wherein the (S, G) pair corresponds to a group associated with the hybrid tree.

18. The nontransitory computer readable medium of claim 13, wherein the constrained algorithm includes a constrained Dijkstra algorithm.

* * * * *